United States Patent [19]
Iida

[11] Patent Number: 5,886,973
[45] Date of Patent: Mar. 23, 1999

[54] OPTICAL DISK AND PLAYBACK METHOD FOR SETTING AN OPTIMUM PLAYBACK BEAM INTENSITY BASED ON READ PLAYBACK BEAM INTENSITY DATA

[75] Inventor: Haruhisa Iida, Yokohama, Japan

[73] Assignee: Nikon Corporation, Tokyo, Japan

[21] Appl. No.: 863,277

[22] Filed: May 27, 1997

[30] Foreign Application Priority Data

May 27, 1996 [JP] Japan .................................. 8-131780

[51] Int. Cl.$^6$ ........................................................ G11B 7/00
[52] U.S. Cl. ................................ 369/116; 369/54; 369/58
[58] Field of Search ............................... 369/116, 54, 59, 369/48, 13, 47, 124

[56] References Cited

U.S. PATENT DOCUMENTS

| | | | |
|---|---|---|---|
| 5,226,027 | 7/1993 | Bakx ........................................ | 369/116 |
| 5,513,166 | 4/1996 | Tokumitsu et al. ...................... | 369/116 |
| 5,539,720 | 7/1996 | Aoi ........................................... | 369/116 |
| 5,617,399 | 4/1997 | Spruit et al. ............................. | 369/116 |
| 5,629,913 | 5/1997 | Kaku et al. .............................. | 369/116 |
| 5,732,061 | 3/1998 | Kirino et al. ............................ | 369/116 |

*Primary Examiner*—Tod R. Swann
*Assistant Examiner*—Kim-Kwok Chu

[57] ABSTRACT

A playback method for an optical disk and an optical disk which records data relating to playback power afford increased data density and accurate playback of high resolution data. The optical disk is played back to retrieve data by first reading out playback beam intensity data and then setting playback beam intensity based on the read playback beam intensity data. Data representing the type of optical disk is also read from the optical disk and then playback beam intensity is set. The disk itself preferably has data relating to optimum playback beam intensity recorded on the substrate in a predetermined position.

21 Claims, 3 Drawing Sheets

OPTICAL DISK AND PLAYBACK METHOD FOR SETTING AN OPTIMUM PLAYBACK BEAM INTENSITY BASED ON READ PLAYBACK BEAM INTENSITY DATA

CROSS-REFERENCE TO RELATED APPLICATIONS

This application is based upon and claims priority of JP Application Number 08-131780 filed May 27, 1996, the contents being incorporated herein by reference.

BACKGROUND OF THE INVENTION

The present invention relates to optical disks. More particularly, the present invention relates to optical disks on which data relating to playback power has been recorded.

Optical disks on which it is possible to record data at a high density, and from which it is possible to playback data at a high speed, are of increasing interest as data storage devices for computers. Optical disks having a diameter of 5.25 or 3.5 inches, i.e. conventional magneto-optical or phase change disks, are capable of rewriting recorded data and are internationally standardized as ISO norms. Recently, norms for digital video disks ("DVD") have also been standardized, and further acceleration is expected in the application of optical disks to the multimedia field.

A concave or convex groove is conventionally formed as a spiral in an optical disk. This groove guides a laser beam which is projected from an optical pickup. This is commonly referred to as "tracking," and the concave or convex groove is referred to as a "guide groove." Through use of this guide groove, data is systematically recorded and arrayed in a row. Moreover, by faithfully tracking a recorded row of data, the data is accurately played back.

In the ISO norm for guide grooves, a concave portion viewed from an optical pickup side is referred to as a "land." On the other hand, a convex portion as seen from the optical pickup side is referred to as a "groove." Data is recorded on one of either lands or grooves. The distance from the center of a land (or groove), to the center of an adjacent land (or groove) is referred to as "track pitch."

The width W of a groove, putting the width of the top of the groove as Wtop, and the width of the bottom of the groove as Wbottom, is defined by W=(Wtop+Wbottom)/2. Moreover, the height from groove bottom to groove top, namely, a difference in level of a land portion and a groove portion, is called "groove depth." The dimensions of groove width, of the type in which recording is performed in land portions, is on the order of 0.3–0.6 $\mu$m. Moreover, if the wavelength of a beam used for record playback is $\lambda$, and the refractive index of a substrate is n, the groove depth is on the order of $$\lambda/(10 \cdot n) \text{ to } \lambda/(6 \cdot n).$$

In an optical disk, preformatted signals of track numbers or sector numbers other than the guide groove are formed in advance as rows of marks which become convex as seen from the optical pickup side, in other words, as rows of pits.

In recent years, opportunities have increased for storage of large amounts of data, primarily for pictures and the like. Such circumstances for recording at higher densities and playing back with high accuracy have strict requirements, and various approaches to address these requirements are being attempted.

During recording, if only a high energy region near the center of the beam is used, suitably small marks can, in principle, be formed. For example, in a playback-only (ROM) type of optical disk, concave-convex pits are formed as follows. First, a photoresist surface is applied to a glass plate and irradiated with a narrow laser beam modulated with data to be recorded. Photo-reactions are then caused to take place locally in the photoresist. After a development process, a concave-convex pattern is formed on the photoresist surface. This pattern is then nickel plated.

After separation of the nickel plating from the concave-convex pattern, a nickel plate is obtained with concave-convex pits formed in the surface. This nickel plate is then set in a metal mold for injection molding, and an optical disk substrate having concave-convex pits is formed by molding. A reflective layer is then formed on the optical disk substrate thereby completing the optical disk. In the phase change type or magneto-optical type of optical disk, small marks can be formed during recording if only the high temperature region close to the beam center is arranged to form the recording marks. However, problems in the above process develop with regard to playback. In order to optically detect the concave-convex pits or magneto-optical marks in a playback beam spot, it is not possible to playback only data which is in a portion of the beam. Accordingly, a first problem of high density recording playback is to accurately playback data having continuous small marks.

In order to solve this problem, the following approach is considered. First, track pitch is made closer. Standard track pitch is 1.6 $\mu$m; however recent trials have been carried out to make the track pitch narrower, i.e. 1.4 $\mu$m or 1.2 $\mu$m. Furthermore track pitch of 1.0 $\mu$m has been reported. However, in the case of an optical pickup loaded with an objective lens having a numerical aperture (NA) of about 0.5–0.6, when the track pitch is made narrower than about 1.4 $\mu$m, data which is recorded on adjacent tracks is simultaneously read out. This is termed "optical crosstalk." Because of this, the recordings cannot be accurately played back.

To afford accurate playback, the wavelength of the playback beam is shortened. In other words, the extent to which the beam is shortened is proportional to the wavelength of the beam. Consequently, playback beam spot size is reduced and recorded data is played back at high density. Thus, the problem of optical crosstalk is avoided.

However, the wavelengths of semiconductor lasers which are presently used as light sources for optical pickups are limited from the standpoint of stability in output power. For example in the prior art, semiconductor lasers were generally of a wavelength of 830 nm. More recently, 680 nm has become the mainstream. That is, by shortening the wavelength to 680 nm, the amount of reduction in beam size is about 18%. However, it is difficult to reduce the beam spot size in rapid progression to ½ or ⅓ of its present form.

A record playback method and medium have been invented by which it is possible to accurately playback data recorded at a suitable high density, even with a playback beam of a conventional size. The basic concept of this invention is generally as follows.

The temperature of the recording medium rises due to playback beam irradiation. Because the medium is moving, the temperature of an advancing direction side of the irradiated playback beam spot becomes a higher temperature. By using this characteristic of temperature distribution and by masking a portion within the spot so that it is not seen by the optical pickup, only a portion of the optical medium which can be seen is played back. Thus, playback of only the data of a small portion of the interior of the spot is possible. That is, the playback beam spot size becomes substantially reduced and data recorded at a high density can be accurately played back.

More specifically, a smaller aperture provides: (1) a low temperature portion within a playback beam spot which becomes an aperture (high temperature portion becomes masked), (2) a high temperature portion within the playback beam spot which becomes an aperture (low temperature portion becomes masked), or (3) a high temperature portion which becomes an aperture (but within the aperture portion, a highest temperature portion is masked). Mask formation is also accomplished by a change in transparency through phase change in which a change of magnetization direction results from a change in magnetic coupling force.

The principles of a conventional device in which a change in magnetization direction is controlled through a change in magnetic coupling force is described with reference to FIGS. 4 (PRIOR ART) and 5 (PRIOR ART). FIG. 5 is a cross section of a principal portion of a conventional magneto-optical disk 20 and also of a temperature distribution of a portion which is irradiated by a playback beam 51. Magneto-optical disk 20 has two magnetic layers, namely a mask layer 55 and a recording layer 56. Data is recorded in a perpendicular direction of magnetization 57 in recording layer 56. Mask layer 55 is disposed above recording layer 56.

As illustrated in FIG. 5, playback beam 51 irradiates the surface of magneto-optical disk 20 and forms a temperature distribution 52. Reference numerals 53 and 54 denote, respectively, high and low temperature regions with respect to a predetermined value.

The direction of magnetization for mask layer 55 is in the plane of mask layer 55 for regions having a temperature lower than a predetermined temperature, i.e. low temperature regions. However, the direction of magnetization for mask layer 55 is oriented in the same direction as the direction of magnetization of recording layer 56 through an exchange of coupling force with recording layer 56, for regions above a predetermined temperature, i.e. high temperature regions. The predetermined temperature arises in small regions close to a center of temperature distribution 52 through irradiation by playback beam 51.

Turning now to FIG. 4, conventional magneto-optical disk 20 moves in disk movement direction 44 to advance a plurality of marks beneath playback beam spot 41. During operation, playback beam spot 41 irradiates a desired mark 46 to be read out and a masked mark 45. The desired mark 46 is within high temperature region 43 while masked mark 45 is within low temperature region 42. Low temperature region 42 is a region where the direction of magnetization is in the planar direction of the mask layer 55. As a result, only desired mark 46 is read out. Thus, even though a plurality of marks may be within the playback beam spot, marks outside the high temperature region are not read out.

Methods of recording and playback of an optical disk include a constant angular velocity (CAV) method and a constant linear velocity (CLV) method. In the CAV method an optical disk is rotated at a constant rpm and thus, the CAV method is suitable for recording and playback at high speeds. In this method, linear speeds differ at an inner circumference and an outer circumference of the disk. During recording, recording beam power is changed according to a radial position on the disk such that a temperature rise in the medium due to irradiation by the beam is maintained constant regardless of radial position. However, the intensity of the playback beam is constant regardless of radial position because the playback signal is at a level which is greater to a degree.

From the above description of recording beam intensity, in a case where playback beam intensity is maintained constant, a temperature increase of the medium differs at the inner circumference and the outer circumference. In a super resolution medium, because the size of the aperture is set according to temperature of the medium, during playback at a constant playback beam intensity, the aperture at the inner circumference becomes large because a temperature rise at the inner circumference becomes large. Moreover, the aperture becomes small at the outer circumference because the temperature rise is small.

For example, a conventional playback state of an inner circumferential part of an optical disk is illustrated in FIG. 3 (PRIOR ART). As illustrated, playback beam spot 31 irradiates partial mark 34 and desired mark 35. In addition, a region of perpendicular magnetization 33 covers desired mark 35 and a portion of partial mark 34, while a region of planar magnetization 32 partially covers partial mark 34. Thus, partial mark 34 and desired mark 35 are simultaneously read out, and a source of error is presented. In other words, optimum playback conditions are not realized over the whole surface. Consequently, playback beam intensity must change according to radial position.

However, thermal capacity varies according to a particular construction of an optical disk, even for optical disks of similar type, and thermal capacity differs from manufacturer to manufacturer. Moreover, even if construction of optical disks is the same, recording layer thickness differs between individual disks, and therefore, scatter exists in their respective thermal capacities.

In view of the above, optimum beam intensity is considered to change for each manufacturer. Moreover, even from the same manufacturer, individual disks may differ. In particular, for a magnetically-induced super resolution medium which uses a magnetic layer as a recording layer, because optimum playback beam intensity differs according to the thickness of the magnetic layer and also construction, there is a tendency for scatter of optimum playback beam intensities to become even larger between disks. Accordingly, for a light beam to perform magnetically-induced super resolution playback, a problem is that optimum playback beam intensity for each individual disk is not set and accurate playback is not possible.

Furthermore, it is difficult to make thickness and composition of recording layers completely uniform with respect to radial direction in a single disk. Some degree of variation, i.e. bias, unavoidably exists. This bias does not differ uniformly for individual disks. In particular, in the case of optical disks for performance of the above-mentioned super resolution playback, even if two optical disks have similar optimum playback beam intensities in some radial positions, mutual differences in optimum beam intensity are obtained when radial positions change. In such cases, a problem is that in each disk, optimum beam intensity cannot be set according to radial position and accurate playback is not possible.

BRIEF SUMMARY OF THE INVENTION

It is therefore an object of the present invention to solve the above problems such that the optimum playback beam intensity is set for any kind of optical disk to perform accurate playback.

It is a further object of the invention to increase storage capacity and increase accuracy during playback of an optical disk, including in particular a magneto-optical disk.

It is a further object of the invention to record optimum playback beam intensity data at a predetermined position on an optical disk, including in particular a magneto-optical disk.

It is a further object of the invention to retrieve stored optimum playback beam intensity data from a predetermined position on an optical disk, including in particular a magneto-optical disk and update an optimum playback beam intensity during playback of data from the optical disk to increase accuracy.

Objects of the invention are achieved by a playback method to retrieve data from an optical disk, including the steps of recording optimum playback beam intensity data in the optical disk; reading out the playback beam intensity data from the optical disk; and setting a playback beam intensity based on the read playback beam intensity data.

Further objects of the invention are achieved by a playback method to retrieve data from an optical disk, including the steps of recording data representing a kind of optical disk in the optical disk; reading out the data representing the kind of optical disk from the optical disk; and setting a playback beam intensity based on the read data.

Moreover, objects of the invention are achieved by an optical disk on which data is recorded by a recording beam and from which data is retrieved by a playback beam, including a substrate; and data recorded on the substrate relating to optimum playback beam intensity.

Even further objects of the invention are achieved by an optical disk on which data is recorded by a recording beam and from which data is retrieved by a playback beam, including a substrate; and data recorded on the substrate in at least one predetermined diameter position and relating to optimum playback beam intensity.

Moreover, objects of the invention are achieved by a playback method to retrieve data from an optical disk, including the steps of recording a signal with a predetermined mark length at a predetermined optimum recording beam intensity; playing back the recorded signal while changing playback beam intensity; determining an optimum playback beam intensity from the played back recorded signal; and recording the optimum playback beam intensity on the optical disk at a predetermined position.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
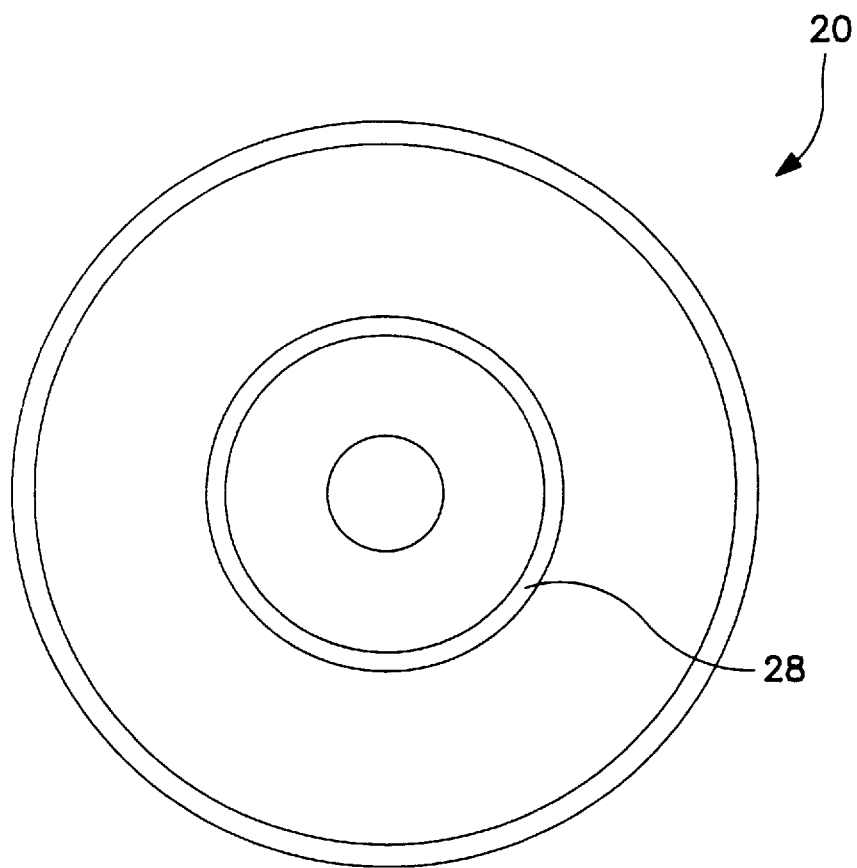
FIG. 1 is a schematic view of an optical disk having optimum playback beam intensity data recorded in a predetermined region, according to a preferred embodiment of the present invention.

Reference will now be made in detail to the preferred embodiments of the present invention, examples of which are illustrated in the accompanying drawings, wherein like reference numerals refer to like elements throughout.

Referring in particular to FIG. 1, a magneto-optical disk 20 includes recorded values of optimum playback beam intensity data in at least one, and preferably a number of radial positions 28. When this type of optical disk is inserted into an optical disk playback device, data is read out which relates to optimum playback beam intensities corresponding to radial positions of the magneto-optical disk 20. Optimum playback beam intensity at the respective radial positions is then set, based on this data, during playback.

According to a preferred embodiment of the present invention, it is possible to determine an optimum playback beam intensity in each track by interpolation or extrapolation of the optimum playback beam intensity data which is recorded in plural radial positions on magneto-optical disk 20. Naturally, the more numerous the radial positions in which the optimum playback beam intensity data is recorded, the more accurate the set intensity of the playback beam. Preferably, optimum playback beam intensity is continuously measured during manufacture of the disk and is recorded in predetermined regions.

When a given disk is initially inserted into a playback device, the playback beam intensity used for reading out the optimum playback beam intensity data cannot be recognized. Even though playback using ultra resolution cannot be initially performed under optimum conditions, it is still necessary to playback this data accurately. Consequently, the data relating to optimum playback beam intensity, in comparison with the actual data which is recorded at high density, is preferably recorded at low density.

When playing back optimum playback beam intensity data, for example in a type of super resolution medium in which a high temperature portion becomes an aperture (low temperature portion becomes a mark), when placed in a state in which the aperture has been made large, thereby setting a raised playback beam intensity, the data is read out with a larger playback signal. This situation is illustrated in FIG. 2.

Figure 2:
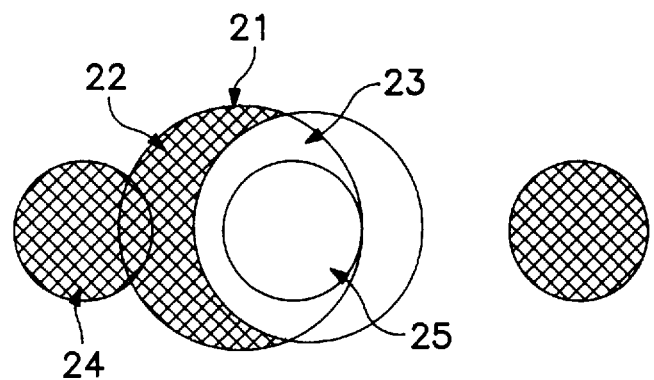
FIG. 2 is a top view of a plurality of marks of recorded data relating to optimum playback beam intensity having a relatively low density, according to a preferred embodiment of the present invention.
Figure 3:
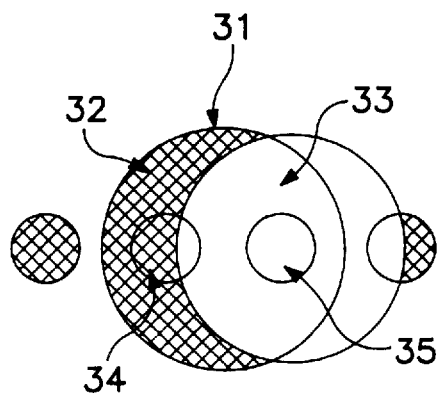
FIG. 3 (PRIOR ART) is a top view of a plurality of marks of recorded data relating to optimum playback beam intensity having a density higher than optimum.
Figure 4:
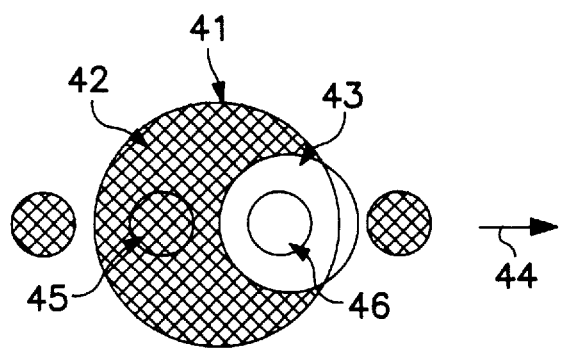
FIG. 4 (PRIOR ART) is a top view of a plurality of marks of recorded data which are recorded at high density with magnetically super resolution.
Figure 5:
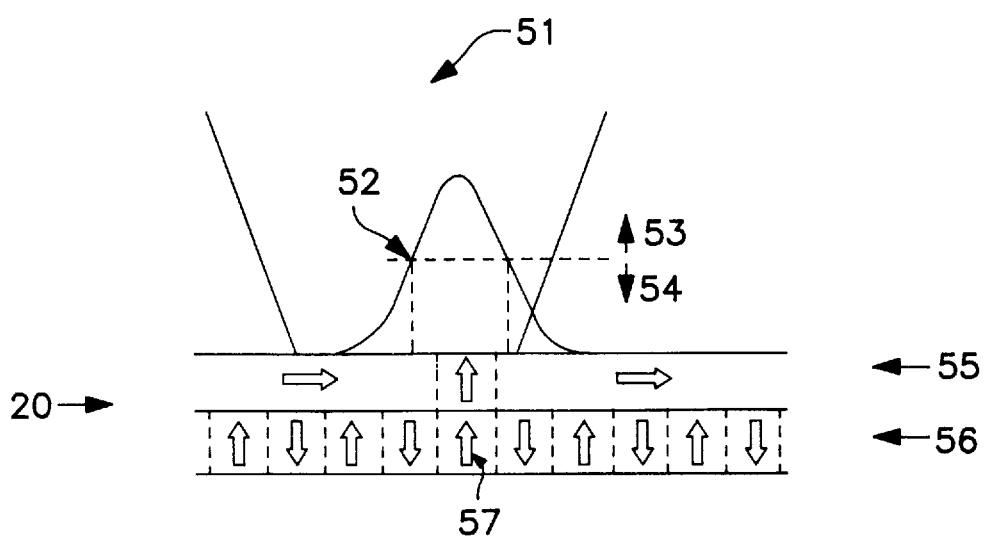
FIG. 5 (PRIOR ART) is a graph representing magnetization of an optical disk.

FIG. 2 illustrates playback beam spot 21 sequentially irradiating a plurality of marks at low density. As illustrated, a region of perpendicular magnetization 23 allows a single desired mark 25 to be read out. Masked mark 24 remains masked by a region of planar magnetization 22. The size of low density mark 25, for example, is significantly larger than the size of recorded data marks having a high density. In the extreme case, data relating to optimum playback beam intensity may be recorded in the same size mark as in the prior art.

According to a first preferred embodiment of the present invention, a magnetron sputtering device sets plural sputtering targets for recording in an optical disk. Preferably, data is recorded on a polycarbonate optical disk substrate having a thickness of 1.2 mm and a diameter of 130 mm. The optical disk substrate is prepared in advance to have precise 0.45 $\mu$m length concave-convex pits on a recording surface.

The above-mentioned optical disk substrate is then set in a sputtering chamber of the above-mentioned sputtering device. After the chamber has been evacuated to $5 \times 10^{-5}$ Pa, while introducing Ar gas, the next six layers are formed in succession. Namely the layers include a quasi-transparent layer of Au; a protective layer of ZnS—SiO$_2$; a chalcogenide mask layer of Ge$_2$Sb$_2$Te$_5$; a protective layer of ZnS—SiO$_2$; a reflective layer of BiSb$_4$; and a protective layer of ZnS—SiO$_2$. A phase-change type of "test" optical disk is prepared in this manner.

The optimum playback beam intensity and a rate of change in optimum playback beam intensity relate to changes in radial position and are found by the following method. The test optical disk is set in a recording and playback device and preferably rotated at 800 rpm. According to a preferred embodiment of the present invention, the beam used for recording and playback has a wavelength of 680 nm with an NA of 0.55.

The above-described test optical disk is played back at the positions of diameters 60, 90, and 120 mm by changing playback beam intensity from 5 mW to 15 mW in 0.1 mW steps respectively. During playback, a C/N value of 42 dB or more is maintained at the position of diameter 60 by a 6 to 8 mW playback beam intensity, and at the position of diameter 90 by a 9 to 11 mW playback beam intensity, and at the position of diameter 120 by a 12 to 13.8 mW playback beam intensity. The designation of "C/N" refers to a ratio of carrier level to noise level. The carrier level is the playback signal level when the recording frequency is a constant value. Thus, C/N is a signal to noise ratio (S/N) taken at a constant recorded frequency.

Based on the above result, an optimum playback beam intensity at the position of diameter 90 mm is determined, for example, to be 10 mW and a rate of change in optimum playback beam intensity accompanying changes in radial position is determined to be 0.1 mW/mm, for maintaining a C/N value of 42 dB or more in all regions. A mold for manufacturing an optical disk substrate having the above described optimum playback beam intensity and the above rate of change in optimum playback beam intensity is formed having concave convex pits on a surface. By using the above described mold, an optical disk substrate is prepared.

Data is preferably formed in a surface of the optical disk substrate by concave-convex shaped pits having a minimum mark length of 0.45 $\mu$m and a minimum mark spacing of 0.45 $\mu$m. Data having an optimum playback beam intensity of, for example, 10 mW is preferably recorded at a position of 90 mm diameter. Data indicating a rate of change in optimum playback beam intensity accompanying changes in radial position is also stored in magneto-optical disk 20. The above data is formed by concave-convex shaped pits preferably having a minimum mark length of 0.9 $\mu$m and a minimum mark spacing of 0.9 $\mu$m. This optimum playback beam intensity data is recorded separately from the above data.

The above-mentioned optical disk substrate is set in a sputtering chamber of the above-mentioned sputtering device. After the chamber has been evacuated to $5\times10^{-5}$ Pa, while introducing Ar gas, the next six layers are formed in succession. Namely, the layers include a quasi-transparent layer of Au; a protective layer of ZnS—SiO$_2$; a chalcogenide mask layer of Ge$_2$Sb$_2$Te$_5$; a protective layer of ZnS—SiO$_2$; a reflective layer of BiSb$_4$; and a protective layer of ZnS—SiO$_2$. A phase change type of optical disk is prepared in this manner.

The optical disk is then set in a recording and playback device and preferably rotated at 800 rpm. According to a preferred embodiment of the present invention, the beam used for recording and playback has a wavelength of 680 nm with an NA of 0.55.

First, data of the optimum playback beam intensity and rate of change of the optimum playback beam intensity accompanying a change in radial position are read out. The control data region of this optical disk is then read out with a playback beam intensity of preferably 10 mW in the above-mentioned radius 90 mm position. The control data region in an inner circumferential part of the optical disk is then read at an intensity greater than the optimum playback beam intensity. Based on the above values, the optimum playback beam intensity for each radial position is set. During playback, in all regions of the optical disk, a C/N value of 42 dB or more is maintained. Namely, data recorded at a high density of minimum mark length 0.45 $\mu$m is correctly played back.

According to a second preferred embodiment of the present invention, a magnetron sputtering device sets plural sputtering targets in an optical disk. A glass optical disk substrate is provided, having a thickness of 1.2 mm and a diameter of 300 mm, and having a tracking guide groove formed on the surface with a pitch of 1.1 $\mu$m. Three kinds of sputtering, namely silicon nitride, GdFeCo and DyFeCo, are preferably set in the sputtering device. Here, according to the second preferred embodiment of the present invention, the composition of the GdFeCo target is Gd 30%, Fe 49%, Co 21%; and the composition of the DyFeCo target, in atom %, is Dy 25%, Fe 52.5%, Co 22.5%.

Next, the above optical disk substrate is set in a sputtering chamber of the above sputtering device. After the chamber has been evacuated to $5\times10^{-5}$ Pa, a pressure of 0.2 Pa is preferably maintained by introducing Ar gas. In this state, by using the silicon nitride target, a silicon nitride protective layer of 60 nm thickness is formed on the side of the substrate having the guide groove. By use of the GdFeCo target, a first magnetic layer of thickness 50 nm functions as a mask on the protective layer. By use of the DyCoFe target, a second magnetic layer of DyFeCo, having a thickness 50 nm, is formed on the first magnetic layer as a recording and playback layer. Finally a protective layer of silicon nitride, having a thickness of 70 nm is formed, again by use of the silicon nitride target. According to the second preferred embodiment of the present invention, a magneto-optical disk is thereby prepared.

The optical disk is next set in a recording and playback device which is capable of performing recording and playback, and the disk is preferably rotated at 1,000 rpm. The beam used for recording and playback preferably has a wavelength of 680 nm with an NA of 0.55.

The optimum playback beam intensity is found by the following method. A signal of mark length 0.45 $\mu$m with a length between marks of 0.45 $\mu$m is recorded at a predetermined optimum recording beam intensity. This signal is then played back while changing the playback beam intensity. The playback beam intensity at which the C/N value becomes highest is found. The optimum playback beam intensity has been found to be, for example, 2.5 mW at a position of 70 mm radius, 3.0 mW at a position of 110 mm, and 3.4 mW at 147 mm. The values of C/N are respectively 42 dB, 44 dB, and 45 dB.

Next, in a predetermined region of the inner circumference of the magneto-optical disk (called a "control data region"), the combined data of optimum playback beam intensities and radial positions are recorded with a minimum mark length of 0.9 $\mu$m having a minimum distance between marks of 0.9 $\mu$m.

Next, the control data region of the innermost circumferential portion of the magneto-optical disk is preferably accessed with a playback beam intensity of 2.8 mW. This intensity is greater than the optimum playback beam intensity at the inner circumferential portion. The above-mentioned combined data of optimum playback beam intensity and radial position are then read out.

For the intermediate radial positions, interpolation is carried out based on the above values and the optimum playback beam intensities are set according to each radial position. By performing playback in this manner, a C/N value of 42 dB or more is maintained in the regions of the whole magneto-optical disk. Further, it is demonstrated that high density recorded data of 0.45 μm minimum mark length can be accurately played back.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A playback method to retrieve data from an optical disk, comprising the steps of:
    recording optimum playback beam intensity data in the optical disk, wherein the optimum playback beam intensity data has a value corresponding to an optimum playback beam intensity;
    reading out the playback beam intensity data from the optical disk; and
    setting a playback beam intensity based on the read playback beam intensity data.

2. A playback method to retrieve data from an optical disk, comprising the steps of:
    recording optimum playback beam intensity data representing a kind of optical disk in the optical disk;
    reading out the optimum playback beam intensity data representing the kind of optical disk from the optical disk; and
    setting an optimum playback beam intensity based on the read data.

3. An optical disk on which data is recorded by a recording beam and from which data is retrieved by a playback beam, comprising:
    a substrate; and
    data recorded on said substrate having a value indicating optimum playback beam intensity such that a playback device controls the playback beam intensity to response to the recorded data value.

4. An optical disk on which data is recorded by a recording beam and from which data is retrieved by a playback beam, comprising:
    a substrate; and
    data recorded on said substrate in at least one predetermined diameter position and having a value indicating optimum playback beam intensity such that a playback device controls the playback beam intensity to response to the recorded data value.

5. The optical disk according to claim 4, wherein
    said data relating to the optimum playback beam intensity contains radial position data and optimum playback beam intensity data corresponding to the radial position data.

6. The optical disk of claim 4, wherein
    said substrate is a super resolution medium from which data may be played back with super resolution by using characteristics of a temperature distribution from a playback beam spot to mask a portion of recorded data.

7. The optical disk according to claim 6, wherein
    the super resolution medium is a magnetically-induced super resolution medium which uses a magnetic layer as a recording layer.

8. The optical disk according to claim 6, wherein
    said data relating to optimum playback beam intensity is first data recorded at a low density in comparison with second data recorded on said substrate at a high density, and the high density affords the playback with super resolution.

9. A playback method to retrieve data from an optical disk, comprising the steps of:
    reading first data with an optimum playback beam intensity and rate of change in optimum playback beam intensity data from the optical disk;
    reading second data from a control data region of the optical disk at an intensity greater than the optimum playback beam intensity; and
    setting an optimum playback beam intensity for each radial position in accordance with the read first and second data.

10. A playback method to retrieve data from an optical disk, comprising the steps of:
    recording a signal with a predetermined mark length at a predetermined optimum recording beam intensity;
    playing back the recorded signal while changing playback beam intensity;
    determining an optimum playback beam intensity from the played back recorded signal; and
    recording an optimum playback beam intensity data on the optical disk at a predetermined position such that a playback device controls the playback beam intensity to response to the recorded data.

11. The playback method according to claim 10, wherein
    said recorded signal is recorded with a predetermined length between successive marks.

12. The playback method according to claim 11, wherein said recorded signal is recorded with a predetermined length between marks of 0.45 μm.

13. The playback method according to claim 10, wherein said recorded signal is recorded with a predetermined mark length of 0.45 μm.

14. The playback method according to claim 10, wherein the optimum playback beam intensity has a highest C/N value.

15. The playback method according to claim 10, wherein
    combined data of optimum playback beam intensity and radial position are recorded in the predetermined position of said optical disk.

16. The playback method according to claim 15, further comprising the steps of:
    accessing the predetermined position of the optical disk with a playback beam having a predetermined intensity greater than an optimum playback beam intensity at an inner circumferential portion of the optical disk; and
    reading out the combined data of optimum playback beam intensity and radial position from said predetermined position.

17. The playback method according to claim 16, further comprising the steps of:
    determining optimum playback beam intensities for a plurality of intermediate radial positions on the optical disk by interpolation of the combined data; and
    setting optimum playback beam intensities corresponding to each radial position based on the interpolated data.

18. The playback method according to claim 10, wherein a C/N value for data recorded on the optical disk exceeds 42 dB.

19. The playback method according to claim 10, further comprising the steps of:
    recording data on the optical disk at a density greater than 0.45 μm minimum mark length.

20. The playback method according to claim 19, further comprising the steps of:

playing back the recording data from the optical disk.

21. An optical disk on which data is recorded by a recording beam and from which data is retrieved by a playback beam, comprising:

a substrate of a super resolution medium on which data may be recorded and played back with super resolution by using characteristics of a temperature distribution from a playback beam spot to mask a portion of recorded data; and data recorded on said substrate in at least one predetermined diameter position and having a value indicating optimum playback beam intensity, wherein said data relating to optimum playback beam intensity is first data recorded at a low density in comparison with second data recorded on said substrate at a high density, and the high density affords the playback with super resolution.

* * * * *